US010989223B2

(12) United States Patent
Parthasarathy et al.

(10) Patent No.: US 10,989,223 B2
(45) Date of Patent: Apr. 27, 2021

(54) COATED FLANGE BOLT HOLE AND METHODS OF FORMING THE SAME

(71) Applicant: General Electric Company, Schenectady, NY (US)

(72) Inventors: Bala Srinivasan Parthasarathy, Bangalore (IN); Guruprasad Sundararajan, Bangalore (IN); Evan Jarrett Dolley, Jr., Niskayuna, NY (US); Leonardo Ajdelsztajn, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 269 days.

(21) Appl. No.: 15/425,257

(22) Filed: Feb. 6, 2017

(65) Prior Publication Data
US 2018/0223870 A1    Aug. 9, 2018

(51) Int. Cl.
*F01D 25/00* (2006.01)
*F04D 29/64* (2006.01)
*F04D 29/52* (2006.01)
*F01D 25/24* (2006.01)

(52) U.S. Cl.
CPC ......... *F04D 29/644* (2013.01); *F01D 25/007* (2013.01); *F01D 25/243* (2013.01); *F04D 29/522* (2013.01); *F05D 2230/311* (2013.01); *F05D 2230/80* (2013.01)

(58) Field of Classification Search
None
See application file for complete search history.

(56) References Cited

U.S. PATENT DOCUMENTS

| 5,111,570 A | | 5/1992 | Baumgarten et al. |
| 5,260,099 A | * | 11/1993 | Haskell ............... C23C 22/74 |
| | | | 427/367 |
| 6,413,582 B1 | * | 7/2002 | Park .................... C23C 10/18 |
| | | | 427/235 |
| 7,262,240 B1 | * | 8/2007 | Breton ................... B05D 5/02 |
| | | | 524/404 |

(Continued)

FOREIGN PATENT DOCUMENTS

| DE | 102009060756 A1 | 7/2011 |
| JP | 2005-180599 A | 7/2005 |

(Continued)

OTHER PUBLICATIONS

International Search Report and Written Opinion issued in connection with corresponding PCT Application No. PCT/US18/14029 dated Apr. 26, 2018.

(Continued)

*Primary Examiner* — Jose I Hernande-Kenney
(74) *Attorney, Agent, or Firm* — Dority & Manning, P.A,

(57) ABSTRACT

Methods for repairing flange bolt holes and the resulting flange bolt holes are provided. The methods and products include the incorporation of a coating system comprising a corrosion resistant layer, which can be formed by resistance plug welding, slurry or sol-gel processing, or thermal/cold spray processing. The corrosion resistant layer can be a super alloy or ceramic material and is different than the base material of the flange bolt hole. Corrosion of the flange bolt hole can be reduced or prevented from occurring with the use of the coating system.

10 Claims, 4 Drawing Sheets

(56) References Cited

U.S. PATENT DOCUMENTS

| | | |
|---|---|---|
| 7,802,350 B2 | 9/2010 | Walker |
| 8,230,569 B2 | 7/2012 | Anantharaman et al. |
| 9,227,278 B2 | 1/2016 | Sullivan et al. |
| 2006/0131364 A1 | 6/2006 | Bouet et al. |
| 2007/0084906 A1* | 4/2007 | Vargas ................ B23K 33/004 228/119 |
| 2010/0243614 A1 | 9/2010 | Bunting et al. |
| 2012/0160664 A1* | 6/2012 | Ivory ..................... B23P 6/00 204/192.38 |
| 2013/0032578 A1* | 2/2013 | Trapp ................ B23K 11/0013 219/78.01 |
| 2013/0081269 A1 | 4/2013 | Trapp et al. |
| 2013/0280524 A1 | 10/2013 | Mabuchi |
| 2017/0038266 A1 | 2/2017 | Syck |
| 2018/0085867 A1* | 3/2018 | Lin ..................... B23K 20/122 |

FOREIGN PATENT DOCUMENTS

| | | | |
|---|---|---|---|
| JP | 2013-160298 A | | 8/2013 |
| JP | 2013160298 A | * | 8/2013 |
| JP | 2014-055334 A | | 3/2014 |

OTHER PUBLICATIONS

Lee, "Repair of rotating air-sealing components for gas turbine engines", International Atomic Energy Agency (IAEA), vol. 7, Issue: 09, 1975.

Mann et al., "The use of interference-fit bolts or bushes and hole cold expansion for increasing the fatigue life of thick section aluminium alloy bolted joints", Defence Science and Technology Organisation (DSTO), pp. 23, Aug. 1983.

European Search Report Corresponding to Application No. 18747567 dated Nov. 9, 2020.

* cited by examiner

COATED FLANGE BOLT HOLE AND METHODS OF FORMING THE SAME

FIELD

Embodiments of the present invention generally relate to repairing corroded flanges, particularly repairing flange bolt holes for aviation gas turbine engines.

BACKGROUND

Gas turbine engines typically include a compressor for compressing air. The compressor includes a series of stages of blades rotating around a shaft. The compressed air is mixed with a fuel and channeled to a combustor, where the mixture is ignited within a combustion chamber to generate hot combustion gases. The combustion gases are channeled to a turbine. The turbine section of a gas turbine engine contains a rotor shaft and one or more turbine stages, each having a turbine disk (or rotor) mounted or otherwise carried by the shaft and turbine blades mounted to and radially extending from the periphery of the disk. A turbine assembly typically generates rotating shaft power by expanding hot compressed gas produced by the combustion of a fuel. Gas turbine buckets or blades generally have an airfoil shape designed to convert the thermal and kinetic energy of the flow path gases into mechanical rotation of the rotor.

The compressor and the combustion chamber are generally connected using two adjoining flanges connected with bolts. The flanges in the high pressure compressor (HPC) casing are generally made of martensitic stainless steel, which tends to corrode in environments with condensing conditions in the presence of chloride ions. The problem is severe if the component is in such corrosive environment at slightly elevated temperatures, which is common in the compressor section during either take-off or landing periods of flights. Pitting corrosion is particularly common. The corroded pits, once developed, can act as stress concentration risers in the component and, thus, requires a repair process to refurbish the damaged regions. The current repair practice employs a reaming process to flush pits without exceeding the allowable limit of the dimensions of the hole and application of an aluminum slurry based coating. However, the aluminum slurry based coating is sacrificial and may lose its efficacy over a period of time. In addition, the reduction reactions that take place during the sacrificial corrosion process may lead to the generation of hydrogen that could result in hydrogen embrittlement under adverse operating conditions.

If the pits are deep, and if there is a need to flush more material beyond the allowable design limit, then currently, such situations are managed by welding with martensitic stainless steel plugs and re-drilling to the original size. Even though this method works well for refurbishment, the repair does not eliminate the propensity for pitting of the component in the next cycles of operation, and thus the repair has to be repeated as and when the pits are seen.

Thus, an improved method of repairing damaged flange bolt holes is desirable in the art.

BRIEF DESCRIPTION

Aspects and advantages of the invention will be set forth in part in the following description, or may be obvious from the description, or may be learned through practice of the invention.

A repaired flange bolt hole is generally provided, the repaired flange bolt hole comprising a flange defining a flange bolt hole having a surface, the flange comprising a base material, a coating system disposed over the surface of the flange bolt hole, wherein the coating system comprises a corrosion resistant layer, a different material than the base material. In certain embodiments, the corrosion resistant layer comprises a nickel super alloy, super austenitic stainless steel, or combinations thereof, and in some embodiments, the corrosion resistant layer comprises a ceramic material. For instance, in some embodiments, the corrosion resistant layer comprises titania, chromia, alumina, or combinations thereof. In certain embodiments, the coating system further comprises an aluminum layer disposed beneath the corrosion resistant layer.

In some embodiments, the coating system has a thickness of about 100 to about 400 microns, and in some embodiments, the coating system has a thickness of about 10 to about 100 microns. The base material comprises stainless steel, such as martensitic stainless steel, in certain embodiments. In some embodiments, the coating system has a porosity of less than about 5%. In some embodiments, the flange bolt hole comprises a circular opening with a depth and a diameter and is disposed along a high pressure compressor in a gas turbine engine.

Aspects of the present disclosure are also drawn to a method of repairing a flange bolt hole, the flange bolt hole having a surface and comprising a base material, the method comprising reaming the flange bolt hole to remove corroded material in the flange bolt hole, and applying a coating system to the surface of the flange bolt hole, wherein the coating system comprises a corrosion resistant layer and this layer is a different material than the base material. In some embodiments, the corrosion resistant layer comprises a nickel super alloy, super austenitic stainless steel, or combinations thereof, and in some embodiments, the corrosion resistant layer comprises a ceramic material, such as titania, chromia, alumina, or combinations thereof. In certain embodiments, the step of applying a coating system to the surface of the flange bolt hole comprises applying an aluminum slurry to the surface of the flange bolt hole.

In certain embodiments, the coating system is applied to a thickness of about 100 to about 400 microns, and in some embodiments, the coating system is applied to a thickness of about 10 to about 100 microns. In certain embodiments, the base material comprises stainless steel, such as martensitic stainless steel.

In some embodiments, the step of applying the coating system to the flange bolt hole comprises resistance welding a plug comprising corrosion resistant material to fill the flange bolt hole and drilling a hole in the plug to reform the flange bolt hole with the filled material forming the coating system disposed on the surface, while in certain embodiments, the step of applying the coating system to the flange bolt hole comprises applying the coating system as a slurry, by thermal spray, by cold spray, or combinations thereof.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Figure 1:
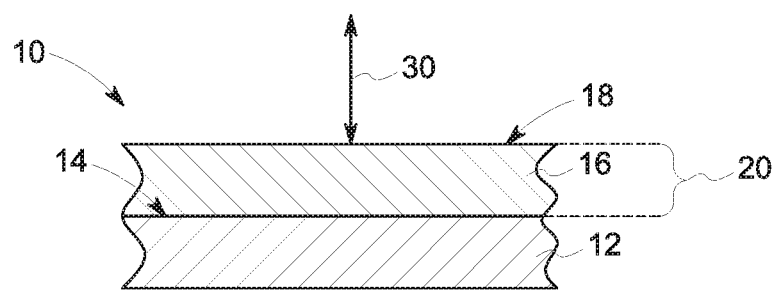
FIG. 1 is a schematic cross-section of an exemplary flange in accordance with one embodiment of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

A coating system, particularly a coating system to repair a corroded casing flange, is generally provided herein, along with methods of forming such coating system. The coating system prevents or reduces the occurrence of corrosion of the underlying metal component. As opposed to prior repair methods, the coating system provides a corrosion barrier effect and, thus, reduces the occurrence of corrosion of the component. The coating system is a cost-effective method of repairing and protecting metal components. The coating system may reduce the need for subsequent heat treatment (which may be needed in prior processes and tends to be labor intensive).

The coating system provides a means of mitigating galvanic and/or pitting corrosion in flange bolt holes. As used herein, a flange bolt hole is generally defined as a generally circular opening or void with a depth and a diameter disposed in a flange and configured to engage with a bolt to secure the flange to an adjoining flange. The flange bolt hole is defined by surfaces of the flange. The flange may be disposed along a component to fix the component to an adjoining component. For instance, in some embodiments, the coating system may be particularly suitable for a flange of a high pressure compressor (HPC) casing in an aviation engine. The coating system may provide a permanent and one-time fix to localized corrosion problems. The coating system can be applied by various processes such as welding, slurry/sol-gel processing, thermal/cold spray processes, or combinations thereof and these processes may be performed after an initial clean-up of the damaged bolt holes to remove corroded or damaged material.

The flange bolt holes in the high pressure compressor (HPC) casing are generally made of martensitic stainless steel (e.g., M152) in aviation engines (e.g., CF34, CFM56, CF6). Pitting corrosion of the martensitic stainless steel tends to occur in environments that have condensing conditions in the presence of chloride ions. The problem is more severe if the component is in this corrosive environment at slightly elevated temperatures (e.g., 50-90° C.) with humid or moist conditions, which is common in the compressor section during take-off or landing periods of the flights. The pits, thus developed, may act as stress concentration risers in the component. Thus, repair is needed.

Current repair practices employ a reaming process to flush pits without exceeding the allowable limit of the dimensions of the hole. An aluminum slurry may be added as a sacrificial coating to provide galvanic protection. If the pits are deep and/or if there is a need to flush more material beyond the allowable limit, then such situations may be managed by welding with M152 plugs and re-drilling to the original size. While this repair may refurbish the component, the propensity for future pitting corrosion is not avoided and future repair is likely.

In contrast, the coating system may provide a permanent fix for corrosion of the metal component. The damaged components may be washed to remove any corroded or damaged material. Then the coating system may be applied to the component to prevent or reduce the occurrence of future corrosion. If the hole size after reaming is within the allowable design limit, then the coating system may be applied directly to the metal component. The coating system may include a corrosion resistant layer and may also include a sacrificial layer beneath that layer to further protect the component. The corrosion resistant layer is highly resistant to corrosion and, thus, protects the underlying metal component from corrosion. The coating system may also improve the mechanical integrity of the component. The corrosion resistant layer may be a nonconductive material such as a ceramic material (e.g., titanita, chromia, alumina, etc., or combinations thereof). The corrosion resistant layer may be a super alloy such as a nickel-based super alloy, cobalt-based super alloy, iron-based super alloy, or combinations thereof. The corrosion resistant layer may be super austenitic stainless steel. One or more of the above corrosion resistant layer may be used in the coating system. The corrosion resistant layer will generally be a different material than the underlying metal component. As used herein, "different material" refers to materials having a different chemistry (e.g., different amounts of an element in the material) or may refer to different types or categories of material (e.g., stainless steel verse super alloy).

If the hole size after reaming is over the allowable design limit, then the coating system may be applied by welding a plug comprising one or more corrosion resistant materials to the reamed component and subsequently re-drilling the desired hole leaving a corrosion resistant layer of the coating system on the surfaces of the hole. The coating system comprising the corrosion resistant layer provides an improved component with reduced corrosion.

The present coating system can be used to repair a variety of metal components. The coating system can also be used as a coating prior to use of the component. That is, the coating system may be applied to the component during initial production of the component as a preparatory step to avoid corrosion of the component. While the present disclosure may be focused on repairing the casing of a HPC, particularly the flange of the compressor casing, the coating system may provide corrosion protection for various sections of a gas turbine engine. For instance, the coating system may be used to prepare components for gas turbine engines, such as in high pressure compressors (HPC), fans, boosters, high pressure turbine (HPT), and low pressure turbines (LPT) of both airborne and land-based gas turbine engines. The coating system may be used in components for a turbofan engine or turbomachinery in general, including turbojet, turboprop and turboshaft gas turbine engines, including industrial and marine gas turbine engines and auxiliary power units.

FIG. 1 is a schematic cross-sectional view of an exemplary flange bolt hole in accordance with one embodiment of the present disclosure. In the embodiment illustrated in FIG. 1, the flange 10 includes a base material 12 and defines a surface 14. The flange 10 surface 14 is coated with a coating system 20 that includes a corrosion resistant layer 16. The coating system 20 has a surface 18. The surface 18 of the coating system 20 is exposed to and defines the flange bolt hole 30. The coating system 20 may be disposed uniformly along the flange 10 surface 14. The coating system 20 may be disposed in certain locations while not being applied in other locations.

The base material 12 of the flange 10 may be any suitable material for the respective application. For instance, the flange 10 may have a base material 12 comprising steel or steel alloys, such as stainless steel, such as martensitic stainless steel, or combinations thereof. The flange 10 may comprise a variety of materials in a variety of layers or configurations. The corrosion resistant layer 16 will generally be a different material than the base material 12.

The corrosion resistant layer 16 may comprise a variety of materials such that corrosion of the base material 12 is reduced or mitigated. The corrosion resistant layer may be formed of corrosion resistant material such as a non-conductive or insulating material such as a ceramic material (e.g., titanita, chromia, alumina, etc., or combinations thereof). The corrosion resistant material may be a super alloy such as a nickel-based super alloy (e.g., IN625), cobalt-based super alloy, iron-based super alloy, or combinations thereof. The corrosion resistant material may be super austenitic stainless steel (SASS, SM0254, AISI904L, etc.). The corrosion resistant layer may comprise one or more of the above materials. The corrosion resistant layer may be in one or more layers or may be disposed in a matrix or dispersion.

The coating system 20 (including the corrosion resistant layer 16) may be applied in a variety of methods, such as by a slurry, sol-gel process, thermal or cold spray process. For instance, the coating system 20, such as the corrosion resistant layer 16, may be applied to the flange 10 by plasma spray, detonation spray, wire arc spray, flame spray, high velocity oxy-fuel coating spray (HVOF), high velocity air fuel (HVAF), warm spray, cold spray, or combinations thereof. In some embodiments, the corrosion resistant layer 16 may be beneficially applied using HVAF. In some embodiments, the coating system 20 is formed to a thickness of about 5 microns to about 500 microns, such as about 10 microns to about 100 microns, about 10 microns to about 50 microns, or such as about 100 microns to about 400 microns.

In some embodiments, the corrosion resistant layer 16 is applied such that the coating system 20 has a low level of porosity. For instance, the coating process may be controlled such that the corrosion resistant layer 16 and/or the coating system 20 has a porosity of less than about 5%, such as less than about 2%, or less than about 1%. The low level of porosity helps ensure that there are no inter-connecting pores, which may expose the underlying base material 12 to the external environment.

Figure 2:
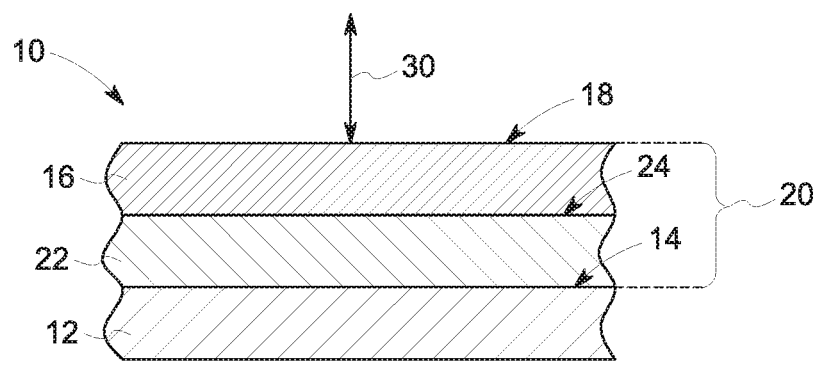
FIG. 2 is a schematic cross-section of an exemplary flange in accordance with one embodiment of the present disclosure.

The coating system 20 generally comprises a corrosion resistant layer 16 and may comprise additional components, such as bond coats, sacrificial coats, or combinations thereof. For instance, FIG. 2 illustrates an embodiment where the coating system 20 includes a sacrificial coating 22 formed beneath the corrosion resistant layer 16 of the coating system 20. FIG. 2 is a schematic cross-sectional view of an exemplary flange in accordance with one embodiment of the present disclosure. The flange 10 includes a base material 12 and defines a surface 14. The coating system 20 is disposed along the surface 14 of the base material 12 and comprises a sacrificial coating 22 that defines a surface 24. The coating system 20 also comprises a corrosion resistant layer 16. The coating system 20 defines a surface 18. The surface 18 of the coating system 20 is exposed to and defines the flange bolt hole 30.

The sacrificial coating 22 may be any suitable coating that provides an additional barrier to corrosion of the underlying base material 12 of the flange 10. For instance, the sacrificial coating 22 may comprise aluminum and may be disposed along the surface 14 of the base material 12 as a slurry or using a sol-gel process. In case of an accidental breach of the corrosion resistant layer, the sacrificial coating 22 provides an additional barrier to the underlying base material 12 and further reduces the occurrence of corrosion of the base material 12. The sacrificial coating 22 may protect against corrosion of the underlying material, but is generally not corrosion resistant. The sacrificial coating 22 may be about 10 microns to about 100 microns thick, such as about 50 microns to about 75 microns thick. One or more sacrificial coatings 22 may be used along the flange 10 and the sacrificial coating 22 may be disposed uniformly or non-uniformly along the flange 10.

Figure 3A:
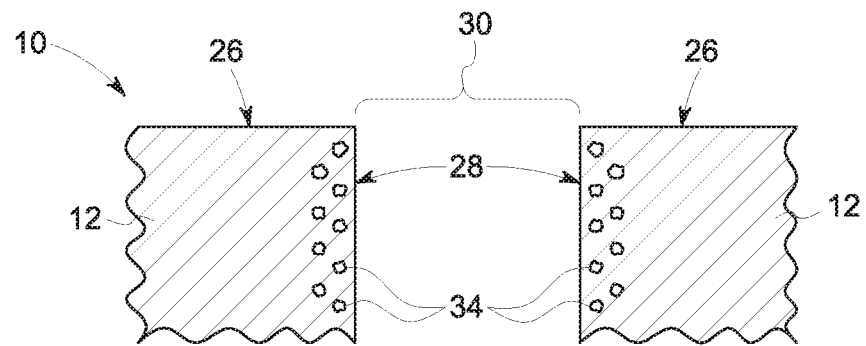
FIGS. 3a-3c are schematic cross-sections of an exemplary flange bolt hole and method of coating the flange bolt hole in accordance with one embodiment of the present disclosure.
Figure 3B:
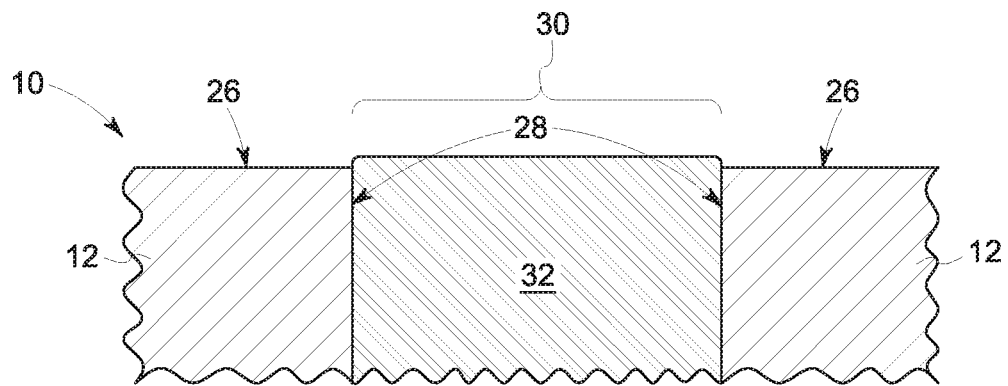
Figure 3C:
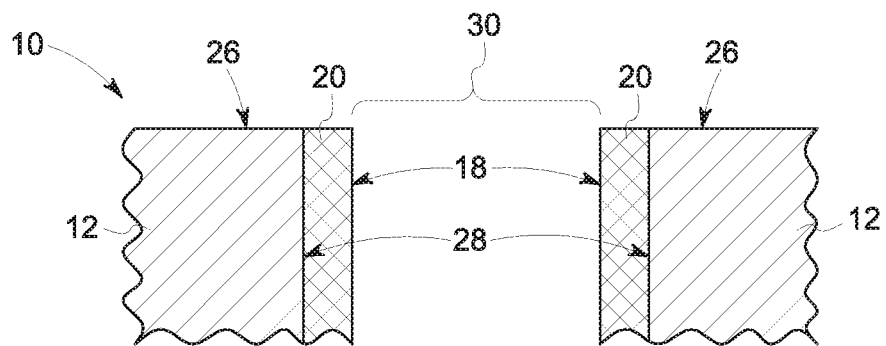

FIGS. 3a-3c are schematic cross-sectional views of an exemplary flange bolt hole and method of coating the flange bolt hole in accordance with one embodiment of the present disclosure. In the embodiment illustrated in FIGS. 3a-3c, the flange 10 includes a base material 12 defining an inner surface 28 and an outer surface 26. The inner surface 28 is the surface defining the flange bolt hole 30 in the flange 10, while the outer surface 26 is the surface of the flange 10 that is either exposed to the external environment or exposed to a second adjoining flange to connect the component to an adjoining component. FIG. 3a illustrates the flange 10 prior to formation of the coating system 20. The base material 12 has corroded material 34 along the inner surface 28. The flange 10 may be cleaned such that the corroded material 34 is removed.

FIG. 3b illustrates the flange bolt hole 30 after plug welding. A plug 32 comprising a corrosion resistant material is inserted into the flange bolt hole 30 of the flange 10 and welded to the flange bolt hole 30. For instance, the plug 32 can be welded by resistance plug welding, friction plug welding, or combinations thereof. The welding process fills the hole with the plug 32, providing a solid state metallurgical bond with the base material 12 of the flange 10.

The plug 32 may comprise any suitable corrosion resistant material, such as those previously listed. For instance, in certain embodiments, the plug 32 may comprise a nickel-based super alloy (e.g., IN625), cobalt-based super alloy, iron-based super alloy, super austenitic stainless steel (SASS, SM0254, AISI904L, etc.), or combinations thereof. Any excess material from the plug 32 may be removed by machining or grinding.

FIG. 3c illustrates the flange bolt hole 30 after re-drilling the hole to the design specifications. Re-drilling of the flange bolt hole 30 leaves a layer of the plug 32 as the coating system 20 comprising a corrosion resistant layer 16 (not labeled in FIG. 3c). The coating system 20 has a surface 18 that covers the inner surface 28 of the flange bolt hole 30. In some embodiments, the coating system 20 may be formed on the outer surface 26 alone or in addition to the inner surface 28. The coating system 20 may have a thickness of about 5 microns to about 500 microns, such as about 10 microns to about 100 microns, about 10 microns to about 50 microns, or such as about 100 microns to about 400 microns.

The coating system 20 thereby provides an improved resistance to the flange against aqueous corrosion, even at elevated temperatures and in humid environments. The coating system 20 also reduces or even eliminates labor intensive multiple heat treatment and baking treatment cycles that are often needed in the current repair methods.

Figure 4:
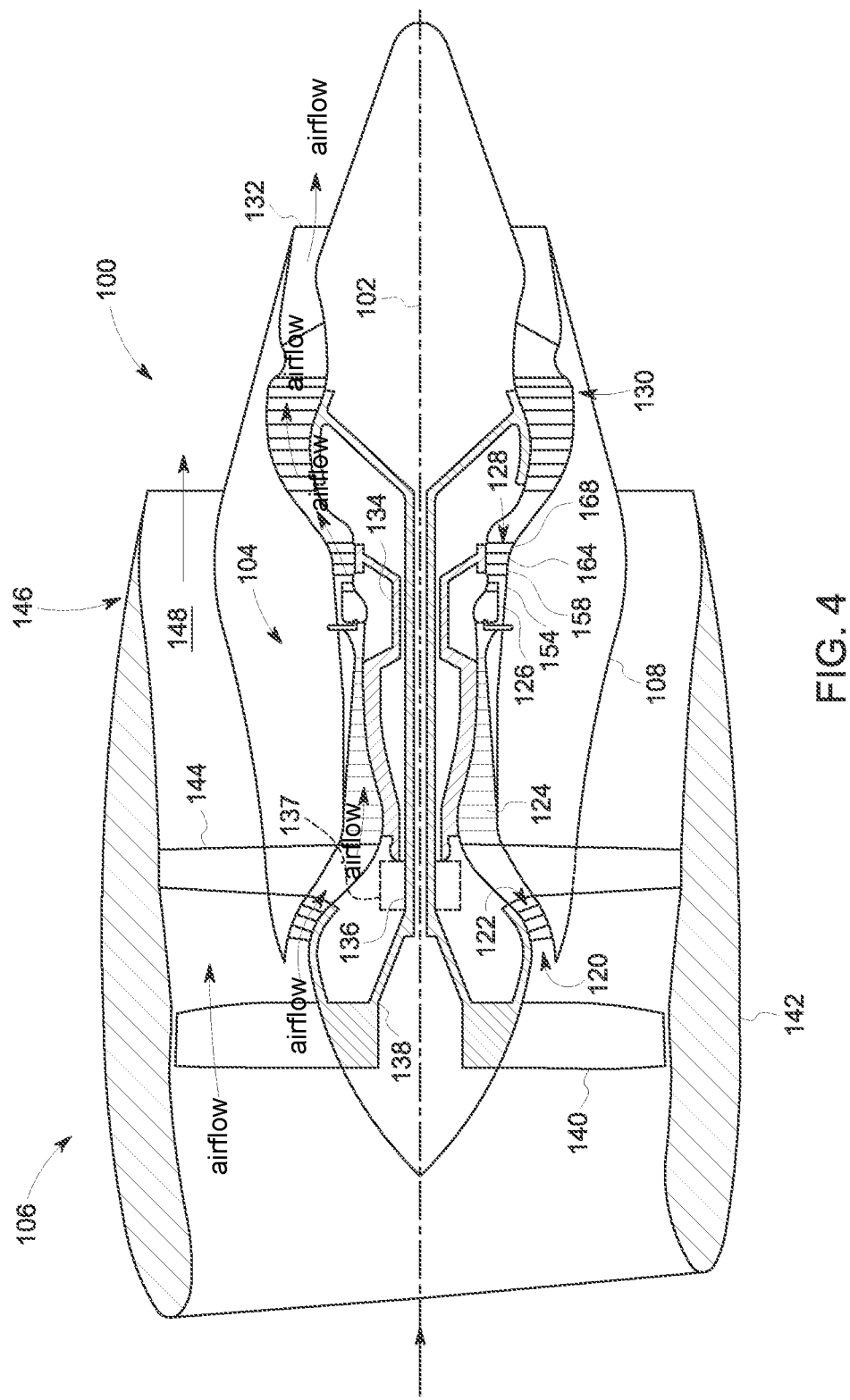
FIG. 4 is a schematic cross-section of a gas turbine engine in accordance with one embodiment of the present disclosure.

FIG. 4 is a schematic cross-sectional view of a gas turbine engine in accordance with one embodiment of the present disclosure. Although further described below generally with reference to a turbofan engine 100, the present disclosure is also applicable to turbomachinery in general, including turbojet, turboprop and turboshaft gas turbine engines, including industrial and marine gas turbine engines and auxiliary power units.

As shown in FIG. 4, the turbofan 100 has a longitudinal or axial centerline axis 102 that extends therethrough for reference purposes. In general, the turbofan 100 may include a core turbine or gas turbine engine 104 disposed downstream from a fan section 106.

The gas turbine engine 104 may generally include a substantially tubular outer casing 108 that defines an annular inlet 120. The outer casing 108 may be formed from multiple casings. The outer casing 108 encases, in serial flow relationship, a compressor section having a booster or low pressure (LP) compressor 122, a high pressure (HP) compressor 124, a combustion section 126, a turbine section including a high pressure (HP) turbine 128, a low pressure (LP) turbine 130, and a jet exhaust nozzle section 132. A high pressure (HP) shaft or spool 134 drivingly connects the HP turbine 128 to the HP compressor 124. A low pressure (LP) shaft or spool 136 drivingly connects the LP turbine 130 to the LP compressor 122. The LP spool 136 may also be connected to a fan spool or shaft 138 of the fan section 106. In particular embodiments, the LP spool 136 may be connected directly to the fan spool 138 such as in a direct-drive configuration. In alternative configurations, the LP spool 136 may be connected to the fan spool 138 via a speed reduction device 137 such as a reduction gear gearbox in an indirect-drive or geared-drive configuration. Such speed reduction devices may be included between any suitable shafts/spools within engine 100 as desired or required.

As shown in FIG. 4, the fan section 106 includes a plurality of fan blades 140 that are coupled to and that extend radially outwardly from the fan spool 138. An annular fan casing or nacelle 142 circumferentially surrounds the fan section 106 and/or at least a portion of the gas turbine engine 104. It should be appreciated by those of ordinary skill in the art that the nacelle 142 may be configured to be supported relative to the gas turbine engine 104 by a plurality of circumferentially-spaced outlet guide vanes 144. Moreover, a downstream section 146 of the nacelle 142 (downstream of the guide vanes 144) may extend over an outer portion of the gas turbine engine 104 so as to define a bypass airflow passage 148 there between.

The HP turbine 128 includes, in serial flow relationship, a first stage of stator vanes 154 (only one shown) axially spaced from turbine rotor blades 158 (only one shown) (also referred to as "turbine blades") and a second stage of stator vanes 164 (only one shown) axially spaced from turbine rotor blades 168 (only one shown) (also referred to as "turbine blades").

Figure 5:
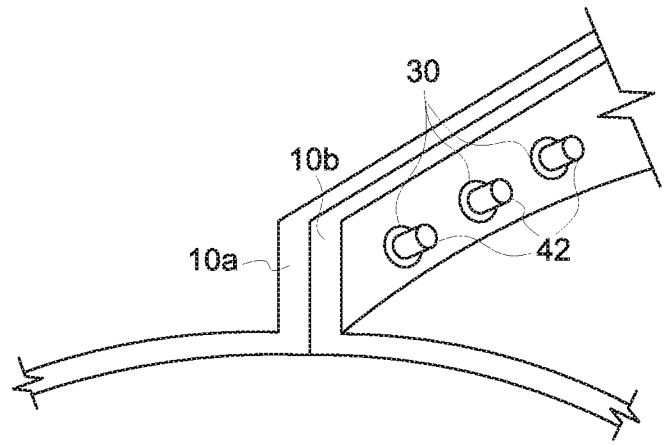
FIG. 5 is a schematic cross-section of a flange for a high pressure compressor in accordance with one embodiment of the present disclosure.

FIG. 5 is a schematic cross-sectional view of a flange for a high pressure compressor. In the embodiment illustrated in FIG. 5, a first flange 10a for the high pressure compressor 124 is shown as well as a second flange 10b of the combustion section 126. Bolts 42 are inserted into flange bolt holes 30 to connect the first and second flanges, 10a and 10b, respectively. While not shown in FIG. 5, the flange bolt holes 30 as well as the bolts 42 and any surface of the flanges 10a, 10b may be coated with the coating system 20. That is, the various surfaces of these components may be prepared with the coating system 20 and/or repaired with the coating system 20 as described herein. For instance, one or more flange bolt holes 30 may be coated with a corrosion resistant layer by thermal or cold spray while one or more flange bolt holes 30 may be coated with a corrosion resistant layer by resistance welding a plug comprising the corrosion resistant material. Various alternatives are available without deviating from the intent of the present disclosure.

While the present disclosure has focused on flanges and the bolt holes in a flange, the coating system may be used to protect any metal component from corrosion. For instance, the coating system may be particularly beneficial in the aviation industry in gas turbine engines where it is desired to have components that can withstand high temperature environments and corrosion-inducing environments. For instance, the coating system may be used with casings for high pressure compressors as well as casings for high pressure turbines, low pressure compressors, and low pressure turbines. The present method allows these components to be made with corrosion protection to reduce subsequent repairs, thereby reducing maintenance costs and time.

Figure 6:
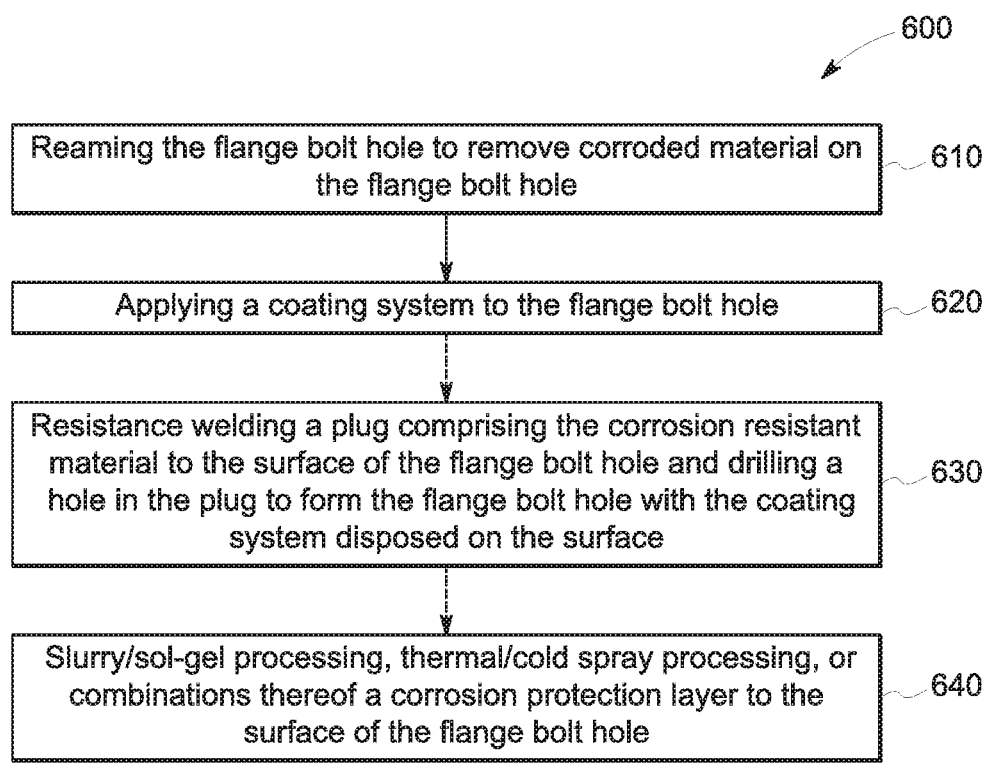
FIG. 6 is a flowchart of an exemplary method of coating a flange in accordance with one embodiment of the present disclosure.

FIG. 6 is a flowchart of an exemplary method of coating a flange in accordance with one embodiment of the present disclosure. In particular, FIG. 6 illustrates a method of repairing a flange bolt hole, the flange bolt hole having a surface and comprising a base material 600. The method 600 includes reaming the flange bolt hole to remove corroded material on the flange bolt hole 610 and applying a coating system to the flange bolt hole 620. In some embodiments, the method 600 may also include resistance welding a plug comprising the corrosion resistant material to the surface of the flange bolt hole and drilling a hole in the plug to form the flange bolt hole with the coating system disposed on the surface 630. In certain embodiments, the method 600 may include thermal or cold spraying a corrosion resistant material to the surface of the flange bolt hole 640. Method steps 630 and 640 are optional and one or both of these steps may or may not be performed in the present method.

While the invention has been described in terms of one or more particular embodiments, it is apparent that other forms could be adopted by one skilled in the art. It is to be understood that the use of "comprising" in conjunction with the coating compositions described herein specifically discloses and includes the embodiments wherein the coating compositions "consist essentially of" the named components (i.e., contain the named components and no other components that significantly adversely affect the basic and novel features disclosed), and embodiments wherein the coating compositions "consist of" the named components (i.e., contain only the named components except for contaminants which are naturally and inevitably present in each of the named components).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of repairing a flange bolt hole for an aviation gas turbine engine, the flange bolt hole having a surface and comprising a base material, the method comprising:
    reaming the flange bolt hole to remove corroded material in the flange bolt hole; and
    applying a coating system to the surface of the flange bolt hole such that the coating system has a porosity of less than about 5%, wherein applying the coating system comprises:
        directly applying a sacrificial coating along the surface of the base material wherein directly applying the sacrificial coating includes at least one of a slurry process, a sol-gel process, thermal spray process, or a cold spray process; and
        applying a corrosion resistant layer on the sacrificial coating, the corrosion resistant layer comprising a different material than the base material and a material of the sacrificial coating, wherein applying the corrosion resistant layer includes at least one of resistance welding or friction welding a plug comprising a corrosion resistant material within the flange bolt hole and drilling a hole in the plug to reform the flange bolt hole with the corrosion resistant layer disposed on a surface of the sacrificial coating,
    wherein the sacrificial coating is configured to corrode following a breach of the corrosion resistant layer in order to provide an additional barrier to the surface of the base material following such a breach.

2. The method according to claim 1, wherein the corrosion resistant layer comprises a nickel super alloy, super austenitic stainless steel, or combinations thereof.

3. The method according to claim 1, wherein the corrosion resistant layer comprises a ceramic material.

4. The method according to claim 1, wherein the coating system is applied to a thickness of about 100 to about 400 microns.

5. The method according to claim 1, wherein the base material comprises stainless steel.

6. The method according to claim 1, wherein applying the corrosion resistant layer comprises applying the corrosion resistant layer on the sacrificial coating such that the corrosion resistant layer has a porosity of less than about 5%.

7. The method according to claim 1, wherein the surface is an inner surface of the flange bolt hole, the flange bolt hole further having an outer surface, the method further comprising:
    applying the coating system to the outer surface of the flange bolt hole.

8. The method according to claim 1, wherein the corrosion resistant layer comprises titania, chromia, alumina, or combinations thereof.

9. The method according to claim 8, wherein applying a coating system to the surface of the flange bolt hole comprises applying an aluminum slurry to the surface of the flange bolt hole.

10. The method according to claim 8, wherein the coating system is applied to a thickness of about 10 to about 100 microns.

* * * * *